Figure 1:
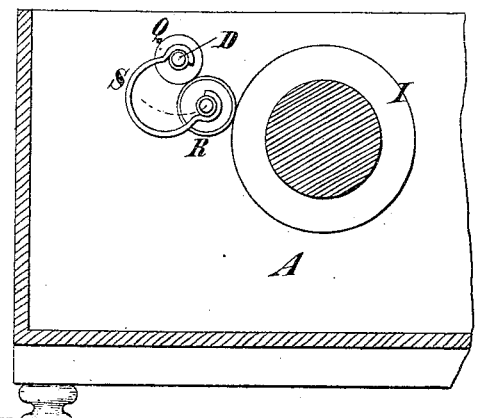

(No Model.)

A. H. HAMMOND.
Mechanism for Transmitting Rotary Motion, &c.

No. 242,307. Patented May 31, 1881.

Witnesses:-

Inventor:-

UNITED STATES PATENT OFFICE.

ANDREW H. HAMMOND, OF WORCESTER, MASSACHUSETTS.

MECHANISM FOR TRANSMITTING ROTARY MOTION, &c.

SPECIFICATION forming part of Letters Patent No. 242,307, dated May 31, 1881.

Application filed April 9, 1881. (No model.)

*To all whom it may concern:*

Be it known that I, ANDREW H. HAMMOND, of Worcester, in the county of Worcester and State of Massachusetts, have invented certain new and useful Improvements in Mechanism for Transmitting Rotary Motion Especially Applicable to Mechanical Musical Instruments, of which the following is a specification.

The object of my present improvements is to provide a simple and reliable means, whereby rotary motion may be transmitted from a shaft or wheel to a roller or shaft, and the rotary motion is prevented from being transmitted in the wrong direction.
The improvements consist in the combination, with a shaft, of a wheel deriving motion therefrom and supported by a hanger suspended from said shaft.

The improvements also consist in the combination, with a shaft, of a wheel mounted thereon, and a wheel in contact with and deriving motion from it, and supported by a hanger suspended from said shaft.

The improvements also consist in the combination, with a shaft or a wheel thereon, of a wheel deriving motion therefrom and supported from said shaft in frictional contact with said shaft or the wheel thereon, and a roller having the periphery of a head faced with india-rubber, india-rubber-coated fabric, or like material, and deriving motion from the wheel which is supported from said shaft.

The improvements also consist in the combination, with a shaft or a wheel thereon, of a wheel supported by a hanger depending from said shaft or the wheel first aforesaid, and having a frictional engagement with the said shaft or wheel, so as to be carried with the latter when the latter is rotated, and a roller or shaft against which the wheel supported by the hanger is brought in contact when the shaft or wheel first aforesaid is rotated, and whereby the wheel supported by the hanger will be forced and held in contact with the shaft or the wheel first aforesaid when the shaft or the wheel first aforesaid is rotated.

The improvements also consist in the combination, with a shaft or a wheel thereon, of a wheel deriving motion therefrom and supported from said shaft in frictional contact with said shaft or the wheel thereon, so that it will, when said shaft or the wheel thereon is rotated in the proper direction, be thereby carried to and held against the device to which it is designed to transmit motion.

The improvements also consist in the combination, with a shaft or a wheel thereon, of a wheel deriving motion therefrom and supported in a hanger suspended from said shaft, so that through its frictional contact with said shaft or wheel it will, upon the rotation of said shaft or wheel in one direction, be carried into contact with the device to which it is to impart motion, and, upon the rotation of said shaft or wheel in the other direction, be carried away from and out of contact with such device.

The improvements also consist in the combination, with a shaft or a wheel thereon, of a wheel for rotating in contact therewith, and a spring-hanger supporting the latter and holding it in close contact with the former and suspended from said shaft.

Figure 2:
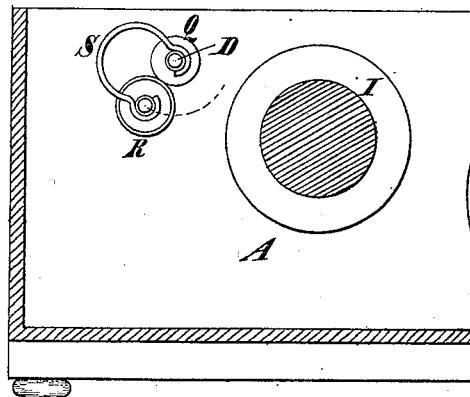
Figure 3:
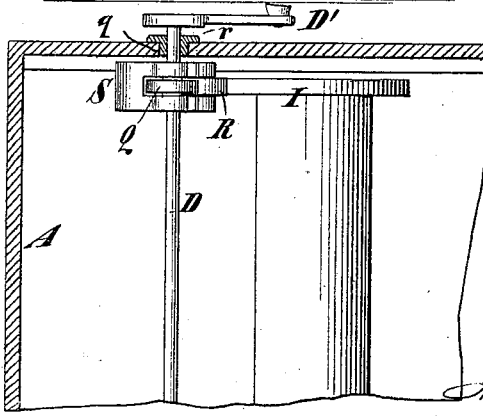

In the accompanying drawings, Figure 1 is a side view of a mechanism embodying my improvements represented as in operation. Fig. 2 is a similar view of said mechanism represented as not in operation, and Fig. 3 is a plan or top view of said mechanism represented as in operation.

Similar letters of reference designate corresponding part in all the figures.

D designates a driving-shaft, which may be mounted in suitable bearings in standards or in the sides of a case, A, and which may have motion imparted to it by a crank, D', or in any other suitable manner.

I designates a roller, to which motion is to be imparted from the driving-shaft D. It may also be mounted in bearings in standards or in the sides of the case A.

Q designates a wheel mounted on the driving-shaft D.

R designates a wheel deriving motion from the wheel Q, and imparting it to the roller I by contact with one of its heads, which may advantageously be faced with india-rubber, india-rubber-coated fabric, or analogous material. The wheel R is mounted in a U-shaped hanger, S, which is suspended from the driving-shaft D. One arm or end of this hanger embraces the shaft D or journal-boxes, which are preferably of wood, fitting on the said shaft upon each side of the wheel Q, and it is thus suspended from said shaft. The other arm or end of the hanger embraces the shaft of the wheel R or journal-boxes receiving and supporting the shaft of the said wheel R. The hanger thus supports the wheel R. This hanger is preferably made of a spring-tempered sheet metal, and is so formed that it exerts a spring force which impinges the peripheries of the two wheels Q R upon each other, thereby creating a frictional contact, so that when the shaft D is rotated in the proper direction the face of the intermediate wheel, R, is brought against the head of the roller I, and is at the same time caused to rotate on its axis. The intermediate wheel transmits a rotary motion to the roller I, causing it to rotate in the same direction as the driving-shaft D.

It is obvious that power exerted in rotating the shaft D is also exerted upon the intermediate wheel, R, when the latter is in contact with the head of the roller I, and that any frictional contact of the wheels Q R and roller I necessary to overcome any resistance to the rotation of the take-up roller is created by that resistance, so that the greater the resistance the greater the frictional contact of the wheels and roller. To disengage the intermediate wheel, R, from the head of the roller I it is only necessary to reverse the rotation of the driving-shaft D sufficiently to break the contact between the peripheries of the wheel R and said roller. A stop may be placed upon one of the walls of the case A to prevent the intermediate wheel, R, and the hanger S from swinging away from the head of the take-up roller farther than may be desired. This method of supporting the intermediate wheel, R, and holding it forcibly in contact with the wheel Q upon the driving-shaft D by the resilience of the hanger S, so as to create the necessary frictional contact, is the one preferred by me; but other methods of creating this frictional contact between the driving-shaft D and the intermediate wheel, R, may be employed.

If the hanger S were flexible and supported from the driving-shaft, so as to have sufficient frictional engagement with it to be carried around with it as it rotates, the hanger need not be made resilient to hold the wheels Q and R in contact. In such case the wheel R will be carried into contact with the roller I when the driving-shaft is rotated in the proper direction, and by the resistance which the roller offers to its further movement with the hanger it will be caused to impinge against the wheel Q. The tendency of the wheel R to travel up the periphery of the roller I also causes it to be crowded back into contact with the wheel Q.

The hanger S may be so supported and combined with the wheel R that gravity or other means may cause the said wheel R to move into contact with the roller I, and be thereby compelled into contact with the wheel Q to produce substantially the same result.

It is the primary object of my improvements, whether or not the hanger S is made of spring-tempered metal, to connect the wheel Q and intermediate wheel, R, by the hanger, with such frictional contact between the said wheels as may be requisite for the transmission of rotary motion from the driving-shaft to the roller, so that whenever the driving-shaft D is rotated it will carry with it the intermediate wheel, R, and its hanger without rotating the latter upon its axis until some object is interposed sufficient to prevent the swinging motion of the intermediate wheel and its hanger.

The subsidiary improvement of making the hanger of sheet-steel or other material having a resilience or contractile force in itself sufficient to create the desired frictional contact between the two wheels, and connecting the wheel R with the driving-shaft D, I deem a valuable one from its compactness, simplicity, and durability. If desirable, a non-resilient hanger may be used, and the required frictional contact of the two wheels Q R obtained by means of a resilient surface upon one or both of these wheels; or in some cases gearing may be substituted for the said wheels.

By facing the periphery of the head of the roller I, against which the wheel R bears, with india-rubber, india-rubber-coated fabric, or like material, a frictional contact is obtained sufficient to effect the rotation of the roller with very little frictional contact between the intermediate wheel, R, and the wheel Q on the driving-shaft.

I will here remark that in practice I may provide the side of the case which is the nearer to the crank D' of the driving-shaft with a large opening, q, through which the said shaft may be easily introduced into its place, and that in such case I may insert between the said opening and the shaft a bushing, r, of hard wood or other suitable material, for securing the shaft in place and forming a durable bearing therefor.

I am aware that it is old to employ, in connection with two wheels supported in fixed bearings, an idler-wheel supported in a movable bearing and adapted to be moved into frictional engagement with both said wheels, for transmitting motion from one to the other of them, and I do not claim this as of my invention.

What I claim as my invention, and desire to secure by Letters Patent, is—

1. The combination, with a shaft, of a wheel deriving motion therefrom and supported by a hanger suspended from said shaft, substantially as specified.

2. The combination, with a shaft, of a wheel mounted thereon, and a wheel in contact with and deriving motion from it and supported by a hanger suspended from said shaft, substantially as specified.

3. The combination, with a shaft or a wheel thereon, of a wheel deriving motion therefrom and supported from said shaft in frictional contact with said shaft or the wheel thereon, and a roller having the periphery of its head faced with india-rubber, india-rubber-coated fabric, or like material, and deriving motion from the wheel which is supported from said shaft, substantially as and for the purpose specified.

4. The combination, with a shaft or a wheel thereon, of a wheel supported by a hanger depending from said shaft or the wheel first aforesaid, and having a frictional engagement with the said shaft or wheel, so as to be carried with the latter when the latter is rotated, and a roller or shaft against which the wheel supported by the hanger is brought in contact when the shaft or wheel first aforesaid is rotated, and whereby the wheel supported by the hanger will be forced and held in contact with the shaft or the wheel first aforesaid when the shaft or the wheel first aforesaid is rotated, substantially as specified.

5. The combination, with a shaft or a wheel thereon, of a wheel deriving motion therefrom and supported from said shaft in frictional contact with said shaft or the wheel thereon, so that it will, when said shaft or the wheel thereon is rotated in the proper direction, be thereby carried to and held against the device to which it is designed to transmit motion, substantially as specified.

6. The combination, with a shaft or a wheel thereon, of a wheel deriving motion therefrom and supported in a hanger suspended from said shaft, so that through its frictional contact with said shaft or wheel it will, upon the rotation of said shaft or wheel in one direction, be carried into contact with the device to which it is to impart motion, and upon the rotation of said shaft or wheel in the other direction be carried away from and out of contact with such device, substantially as specified.

7. The combination, with a shaft or a wheel thereon, of a wheel for rotating in contact therewith, and a spring-hanger supporting the latter and holding it in close contact with the former and suspended from said shaft, substantially as specified.

A. H. HAMMOND.

Witnesses:
T. J. KEANE,
FREDK. HAYNES.